United States Patent [19]

Christiansen et al.

[11] Patent Number: 4,654,194
[45] Date of Patent: Mar. 31, 1987

[54] INLET NOZZLE ASSEMBLY

[75] Inventors: David W. Christiansen, Kennewick; Richard A. Karnesky; Donald R. Precechtel, both of Richland; Bob G. Smith; Ronald C. Knight, both of Richland, all of Wash.

[73] Assignee: The United States of America as represented by the United States Department of Energy, Washington, D.C.

[21] Appl. No.: 773,891

[22] Filed: Sep. 9, 1985

[51] Int. Cl.⁴ .............................................. G21C 3/32
[52] U.S. Cl. ..................................... 376/443; 376/446
[58] Field of Search .............. 376/443, 446, 352, 377, 376/389

[56] References Cited

U.S. PATENT DOCUMENTS

| | | |
|---|---|---|
| 3,146,173 | 8/1964 | Fortescue et al. ............... 376/352 X |
| 3,773,617 | 11/1973 | Marmonier et al. ............. 376/352 X |
| 3,971,698 | 7/1976 | Wolff et al. ..................... 376/443 X |
| 4,032,398 | 6/1977 | Cross et al. ....................... 376/443 |
| 4,505,877 | 3/1985 | Rion .................................. 376/352 |

FOREIGN PATENT DOCUMENTS 46-28758  8/1971  Japan ................................... 376/443

Primary Examiner—Deborah L. Kyle
Assistant Examiner—John S. Maples
Attorney, Agent, or Firm—Robert Southworth, III; Judson R. Hightower

[57] ABSTRACT

An inlet nozzle assembly for directing coolant into the duct tube of a fuel assembly attached thereto. The nozzle assembly includes a shell for housing separable components including an orifice plate assembly, a neutron shield block, a neutron shield plug, and a diffuser block. The orifice plate assembly includes a plurality of stacked plates of differently configured and sized openings for directing coolant therethrough in a predesigned flow pattern.

10 Claims, 6 Drawing Figures

INLET NOZZLE ASSEMBLY

The U.S. Government has rights in this invention pursuant to Contract No. DE-AC14-76FF02170 between the U.S. Department of Energy and the Westinghouse Electric Corporation.

BACKGROUND OF THE INVENTION

The present invention relates generally to nuclear fuel assemblies and, more particularly, to a novel nozzle arrangement employed in a fuel assembly.

The reactor core of a typical fast breeder nuclear reactor is designed to sustain a continuous sequence or chain of fission reactions, and generally contains a multiplicity of similarly constructed fuel assemblies vertically oriented in a side-by-side relation. Each fuel assembly, in turn, contains a multiplicity of thin, elongated fuel elements or pins containing stacked fuel pellets formed of radioactive material, such as uranium, thorium, or plutonium compounds for example. As is known, the heat generated by the fission reactions is transferred to a circulating coolant, such as liquid sodium for example, and subsequently transmitted to a secondary coolant, such as water, for conversion into steam for generating electrical energy.

In addition to the multitude of fuel pins, each fuel assembly usually comprises a relatively thin-walled duct tube serving as the jacket or housing for the fuel pin as well as a conduit for the passage of coolant therethrough, a shield/inlet nozzle assembly for introducing the coolant into the fuel assembly, and a handling socket at the other end of the duct tube to facilitate insertion and removal of the assembly into and from the core. Each fuel assembly must maintain its structural integrity during various stages of reactor operation including heat up, cool down, shut down, and powered operations as well as withstand the most adverse operative conditions expected during its lifetime.

The shield/inlet nozzle assembly allows coolant to enter the fuel assembly while providing neutron shielding. It structurally ties the fuel pins to the support member and normally is welded to the duct tube to provide overall structural continuity for the fuel assembly. Conventionally, the nozzle assembly contains several block sections, such as an orifice block, a neutron shield block, and a diffuser block all welded in place within the nozzle assembly. These several block elements are formed with various orifice or passage patterns to establish coolant flow requirements dictated by the specific fuel assembly being designed. Since these assemblies differ according to their function and/or location relative to the axis of the nuclear core, it can be appreciated that a variety of different orificing arrangements must be contemplated. Moreover, once a particular orifice pattern is incorporated within a specific assembly, this orifice pattern remains fixed and, since varying power conditions and temperatures are encountered during an operating cycle, optimum coolant flow during various stages of operation cannot be realized.

Another problem encountered in liquid metal cooled reactors, particularly those utilizing liquid sodium as a coolant, is their susceptibility to a phenomenon often referred to as "Flow Impedance", which is the gradual increase of pressure required to maintain a constant volume of coolant flow. This is believed to be caused by the deposition of particulates, such as silicon compounds, on the inlet end of core components and on the wall surfaces of the piping system. It is estimated that the effects of such phenomena can result in an operating penalty of $40,000,000 a year in a large commercial reactor. For a more detailed description of this phenomenon, as well as one approach for solving this problem, reference may be made to U.S. patent application, Ser. No. 554,867, filed on Nov. 25, 1983, and assigned to the saae assignee as the present invention.

Accordingly, it is a primary object of the present invention to obviate the above noted shortcomings by providing a new and useful inlet nozzle assembly for nuclear reactor fuel assemblies.

It is another object of this invention to provide in the foregoing nozzle assembly replaceable internal block elements to simplify fabrication and optimize fuel assembly design, effect nozzle standardization of core component assemblies, permit quick and easy non-destructible dismantling and replacement of assembly components, and facilitate cleaning of the several elements and components.

It is still another object of the present invention to provide in the foregoing inlet nozzle assembly a novel orifice plate assembly comprised of a plurality of differently orificed plates selectively utilized in accordance with desired coolant flow requirements for a specific fuel assembly.

It is a further object of this invention to detachably connect the above mentioned nozzle assembly to the associated fuel assembly to facilitate removal and replacement of the internal elements of the inlet nozzle assembly.

It is still a further object of the present invention to provide the foregoing nozzle assembly with means for removing particulates from the coolant stream flowing therethrough.

These and other objects, advantages, and characterizing features of the present invention will become clearly apparent from the ensuing detailed description of an illustrative embodiment thereof, taken together with the accompanying drawings wherein like reference characters denote like parts throughout the various views.

SUMMARY OF THE INVENTION

An inlet nozzle assembly comprising an elongated shell for housing separable components including an orifice plate assembly, neutron shielding means, and coolant diffusing means. The orifice plate assembly includes a plurality of orifice plates of differently configurated and sized openings for directing coolant flow therethrough in a predetermined flow pattern.

DETAILED DESCRIPTION OF THE PREFERRED EMBODIMENT

Figure 1:
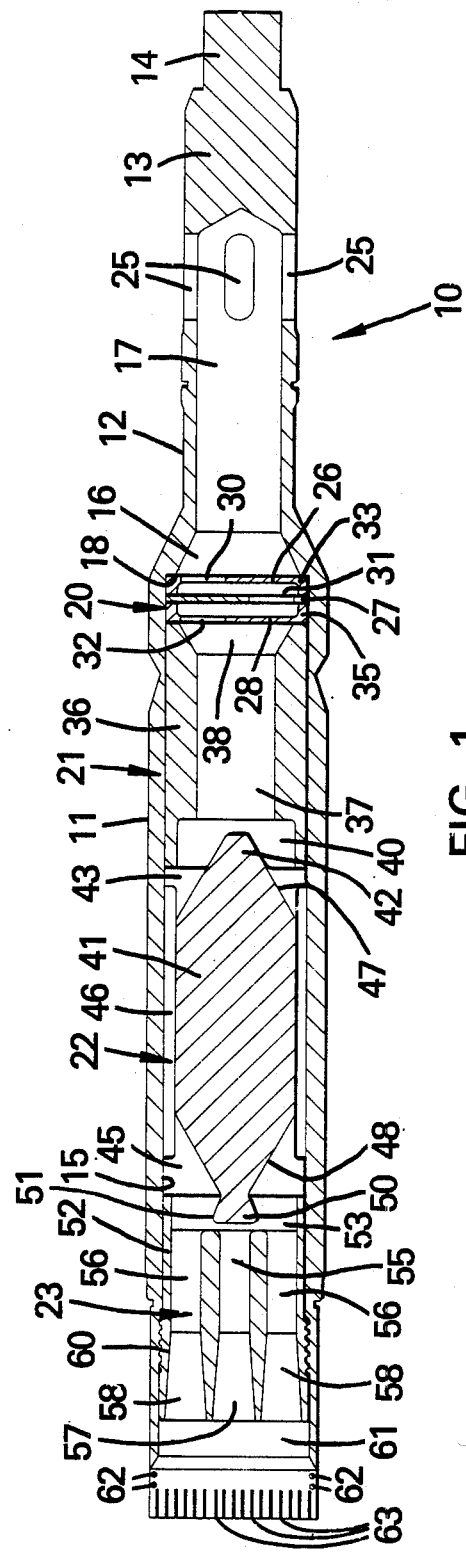
FIG. 1 is a longitudinal sectional view of one form of an inlet nozzle assembly constructed in accordance with this invention.

Referring now in detail to the illustrative embodiment depicted in the accompanying drawings, there is shown in FIG. 1 an inlet nozzle assembly, comprehensively designated 10, constructed in accordance with this invention. This inlet nozzle assembly 10 forms the lower end of a fuel assembly and is suitably connected at the upper end thereof to the lower portion of a duct tube (not shown)in a manner well known in the art. As used herein, the terms upper, lower, top, bottom, vertical, horizontal and the like are applied only for convenience of description with reference to FIG. 1 and, while oriented in such an attitude in a fast breeder nuclear reactor, should not be taken as limiting the scope of this invention.

The inlet nozzle assembly 10 comprises an elongated shell 11 provided with a reduced diameter lower portion 12 having a solid bottom portion 13 terminating in a cylindrical post 14. The post 14 is sized and adapted to fit into a complementary shaped cavity formed in the supporting structure for the reactor core. The sizing of the post 14 and the associated cavity assures precise positioning of each of the many fuel assemblies located within the several hexagonal rows of the reactor core.

Except for the solid bottom portion 13, the shell 11 is hollow throughout and is formed with an elongated chamber portion 15 of uniform cross section which then tapers downwardly to form a throat portion 16 and terminates in a lower chamber portion 17 of lesser cross sectional dimension than the major chamber portion 15. A shoulder or seat 18 is formed between the juncture of chamber portion 15 and throat 16 for supporting several internal components, including an orifice plate assembly 20, a shield block 21, a shield plug 22, and a diffuser 23, each of which will hereinafter be described in detail. A plurality of elongated slots 25 are formed in the lower portion 12 of shell 11 just above the solid portion 13 to provide inlet passages for the coolant adapted to be directed upwardly through the nozzle assembly 10 and the fuel assembly duct attached thereto.

The orifice plate assembly 20 comprises a plurality of orifice plates 26, 27, and 28 stacked in a vertically back-to-back relation. While 3 such plates are shown in the embodiment illustrated in FIG. 1, the present invention envisions the use of any nuaber of orifice plates as dictated by the flow requirements for a specific fuel assembly. Indeed, a significant feature of the present invention is the selective use of differently orificed plates to realize the flow pattern desired in a particular fuel assembly to obtain optimum coolant flow therethrough without pressure increases and without impacting neutron shielding. For example, where greater coolant flow is desired without significantly increasing pressure, one of the plates, say plate 28 for example, can be removed. Where impeded coolant flow is desired, additional plates can be added to the assembly 20, as desired or required.

Figure 2:
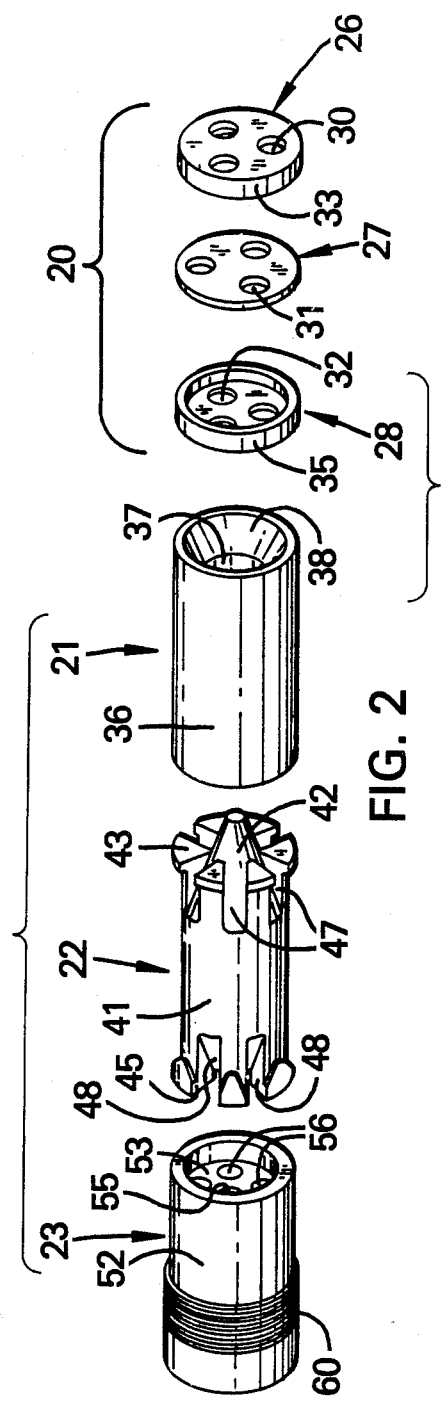
FIG. 2 is an exploded view showing the internal components separably mounted in the inlet nozzle assembly of FIG. 1.

The plates 26–28 are formed with one or more flow through openings or orifices 30, 31 and 32, respectively, which can be offset from each other to establish the desired flow path in a particular assembly. Also, the shape of the plates can vary. For example, as shown in FIGS. 1 and 2, the plates 26 and 28 are provided with annular body portions having peripheral rims or flanges 33 and 35, respectively, while the plate 27 interposed therebetween is formed as a circular disk. As mentioned earlier, these orifice plates are placed in a vertically stacked relation with the lowermost plate supported and resting on the seat 18.

The shield block 21 is seated on the orifice plate assembly 20 and comprises a generally cylindrical body 36 having a central bore 37 therethrough provided at one end with a tapered inlet opening 38 adjacent to the orifice plate assembly 20 and at the other end with a recess 40 forming the outlet of block 21. The shield block 21 serves as a neutron shield to impede the neutron flux generated within the associated fuel assembly from passing onto the nuclear core's supporting structure.

The shield plug 22 further inhibits neutron flux flow and comprises a generally cylindrical body 41 having a tapered nose 42 projecting downwardly into recess 40 of shield block 21. The opposite ends of body 41 are formed with radial flanges 43 and 45 extending radially outwardly into engagement with the inner wall surface of shell 11. These flanges 43 and 45 define an annular space 46 between body 41 and the shell wall for the passage of coolant from the lower end to the upper end of the plug 22. The lower flange 43 seats on the upper end of shield block 21 while the upper flange 45 serves as a seat for the diffuser 23.

All of the parts of the nozzle assembly including the shield block and shield plug are preferably made from amterials that are resistant to degradation in molten sodium in a high neutron flux. Typically this material may be an alloy such as stainless steel.

A plurality of circumferentially spaced, tapered channels 47 are formed on the lower end of body 41 and provide passages for the flow of coolant from outlet recess 40 of shield block 21 to the annular passage defined by space 46. Likewise, circumferentially spaced, tapered channels 48 are formed at the opposite or upper end of body 41 to provide passages for the flow of coolant from space 46 upwardly to the diffuser 23. The upper end of body 41 is formed with a tail portion 50 having an outwardly flared sidewall 51 for uniformly dispersing the coolant upwardly and outwardly into diffuser 23.

The diffuser 23 functions to disperse or distribute the upwardly flowing coolant into the duct (not shown) of the fuel assembly for uniform flow about the multiplicity of fuel pins contained therein. The diffuser 23 comprises a generally cylindrical body 52 seated on the upper flange 45 of shield plug 22. The lower end of body 52 is recessed, as at 53, and accommodates the tail portion 50 of plug 22. A central axial bore 55 is formed in body 52. Also, a plurality of bores 56 are formed in body 52 in a circumferential array about the central bore 55 in radially spaced relation thereto. The bores 55 and 56 flare gradually outwardly, as at 57 and 58, for directing the coolant uniformly upwardly through the fuel assembly duct (not shown). The outer surface of body 52 is foraed with a threaded portion 60 for engagement with the internal threads provided at the upper end of shell 11.

In assembling the nozzle assembly 10, the several orifice plates forming the plate assembly 20 are placed within shell 11 and positioned against the seat 18. The shield block 21 and shield plug 22 are successively placed within the shell 11 in a vertical stacked relation against the orifice plate assembly 20 and against each other. Next, the diffuser 23 is threaded into place in bearing relation against the stacked components to tightly secure the same against the seat 18. Completing the assembly 10 are a pair of laterally spaced support plates 61 (only one of which is shown in FIG. 1) secured to the adjoining housing 11 by pins 62. These support plates are formed with slots 63 for receiving support bars (not shown) onto which the lower ends of individual fuel pins (also not shown) are secured.

Figure 4:
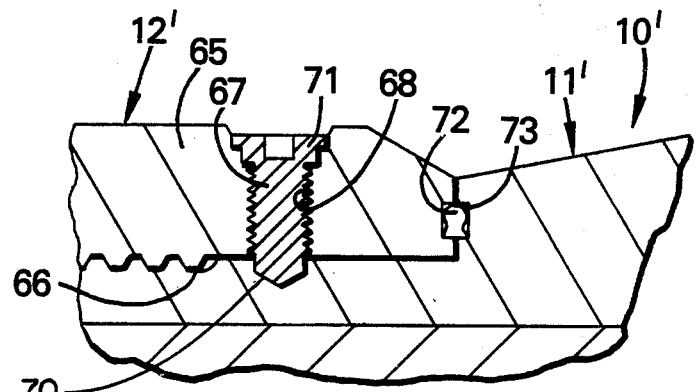
FIG. 4 is a fragmentary, sectional view, on an enlarged scale, of the inlet nozzle assembly of FIG. 3.
Figure 3:
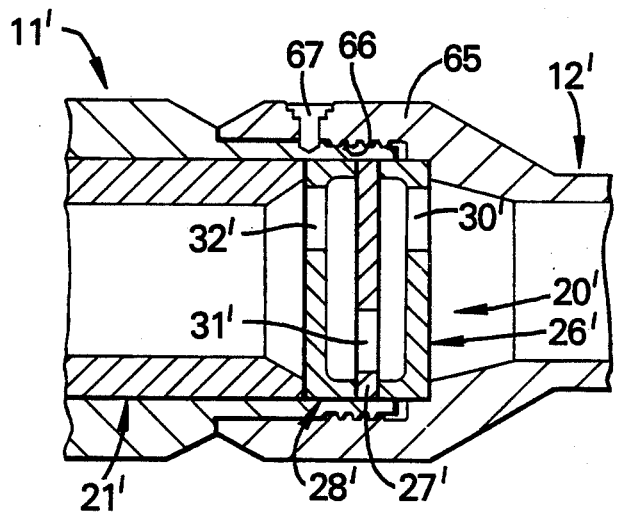
FIG. 3 is a fragmentary, sectional view of another form of inlet nozzle assembly of this invention.

FIGS. 3 and 4 illustrate another form of an inlet nozzle assembly 10' of this invention which is very similar to the form described above with the exception that the shell 11' is foreshortened and the lower portion 12' of the nozzle assembly containing the orifice plate assembly 20 is detachably connected to the shell 11'. The remaining structural elements are identical to those described above and the same numerals primed are utilized to identify similar parts. The detachable lower portion 12' is provided at its upper end with a bell formation 65 having internal threads 66 engageable with external threads formed on the lower end of shell 11'. One or more set screws 67 are threaded into suitable tapped bores 68 formed in bell formation 65 and received within a recess 70 formed in the lower end of shell 11'. As best shown in FIG. 4, the set screw 67 is formed with a head 71 disposed inwardly of the outer surface of bell formation 65 and can be swaged or crimped into an adjacent groove formed in the bell formation 65 to lock the screw 67 in place. Disassembly can be readily accomplished by drilling out the set screw crimp and/or turning the screw 67 with sufficient torque to decrimp the head. This detachable arrangement for the lower portion of the nozzle assembly facilitates quick and easy removal and/or replacement of the orifice plates without disturbing the other components. Moreover, the orifice assembly 20 can be formed integral with the shell lower portion 12' and the mating connections of members 11' and 12' can be formed to preclude inadvertent installation of a high flow fuel assembly with a low flow nozzle arrangement and vice versa. A suitable annular seal 72 is provided in a groove 73 formed between the aating surfaces of shell 11' and nozzle portion 12' to provide leaktight pressure sealing therebetween.

Figure 6:
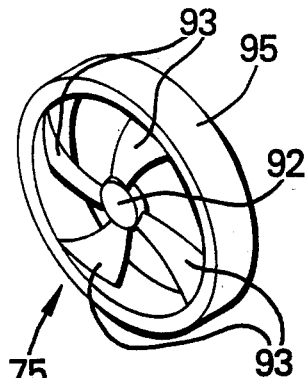
FIG. 6 is a perspective view of a specially configurated orifice plate used in the form of the invention shown in FIG. 5.
Figure 5:
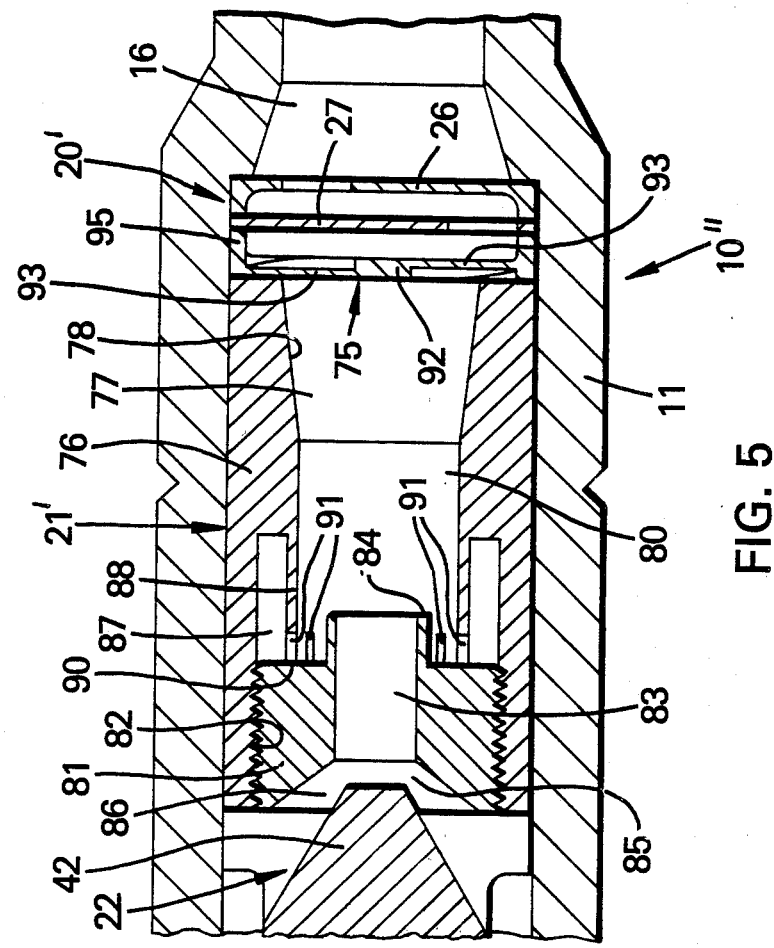
FIG. 5 is a fragmentary, sectional view, on an enlarged scale, of another form of orifice plate assembly and shield block used in conjunction with the inlet nozzle assembly of this invention.

FIGS. 5 and 6 illustrate still another form of an inlet nozzle assembly 10" of this invention which depicts a specially configurated shield block 21' and orifice plate 75 used in conjunction therewith. The shield block 21' comprises a generally cylindrical body 76 having an inlet opening 77 defined by a tapered or converging wall 78 and which communicates with a central passage 80. An insert 81 is threaded into a tapped counterbore 82 formed in body 76 and is provided with a longitudinal bore 83 communicating with passage 80. The insert 81 is formed at one end with a central embossment 84 extending downwardly into passage 80 and at the other end with a divergent outlet 85 for accomaodating the tapered nose 42 of shield block 22 and defining therewith a diverging conical passage 86.

The shield block body 76 is provided with an annular well 87 concentric with the axis of passage 80 and defines therebetween a relatively thin cylindrical wall portion 88. The upper edge 90 of the wall portion 88 serves as a stop or seat for the lower face of insert 81. Wall portion 88 is formed with a plurality of circumferentially spaced, longitudinal slots 91 extending from the upper edge 90 inwardly into wall portion 88. These slots 91 provide passage for undesirable particulates into the well 87 which traps and collects such particulates therein.

The orifice plate 75 comprises a central hub portion 92 having a plurality of circumferentially spaced, curved vanes 93 projecting radially therefrom and terminating in an annular rim 95. These vanes 93 impart a high speed cyclonic flow to the coolant flowing upwardly therethrough. As the rotating or spiraling coolant moves upwardly past orifice plate 75, the rate of spiraling is accelerated by virtue of the tapered wall section 78. This high speed swirling action produces a centrifugal force causing the heavier particles entrained in the coolant to be swept upwardly along the wall defining passage 80. The momentum induced in these particles causes them to be guided into the area between embossment 84 and wall portion 88 and ejected through the several slots 91 into the well 87. The engagement of the lower face of insert 81 against wall portion 88 isolates the well 87 from the coolant flow stream to retain the particles in well 87. The coolant flowing upwardly through bore 83 is diffused radially outwardly through the conical passage 86. In this manner, particulates can be effectively separated in the shield block 21' of a nozzle assembly and retained therein until removal of the assembly during refueling and/or replacement thereof. Moreover, the outer configuration of the shield block 21' and orifice plate 75 can be readily substituted for the block 21 and any of the orifice plates hereinbefore described in connection with FIG. 1.

From the foregoing, it is apparent that the objects of the present invention have been fully accomplished. As a result of this invention, a new and improved inlet nozzle assembly is provided for optimizing coolant flow to the associated fuel assembly while adequately shielding the permanent core supporting structure. The inlet nozzle assembly is comprised of a plurality of easily replaceable internal components arranged in a stacked back-to-back relation for fabrication simplicity and ease of non-destructive replacement. By the provision of a plurality of orifice plates having differently sized and configurated openings, optimum coolant flow design for specific fuel assemblies can be achieved. By providing the shield block with an annular well in conjunction with a specially configurated, vane-type orifice plate, particulates can be effectively removed from the coolant flow stream. Also, the provision of a separable threaded lower nozzle section adjacent the orifice plate assembly facilitates replacing and substituting plates of differently configurated orifices to extend the useful life of a fuel assembly.

We claim:

1. A nozzle assembly for directing coolant into the duct tube of a fuel assembly attached thereto compising: an elongated shell having inlet openings adjacent one end thereof for admitting coolant thereinto, an orifice plate assembly in said shell downstream of said inlet openings, neutron shielding means in said shell downstream of said orifice plate assembly, diffusing means in said shell downstream of said neutron shielding means for dispersing said coolant uniformly through said duct tube, said orifice plate assembly comprising a plurality of separable stacked orifice plates having differently configurated and sized openings, respectively, for directing said coolant therethrough in a predetermined flow pattern, and wherein one of said orifice plates includes means for imparting a spiral flow to said coolant, and said shielding means includes a shield block having a central passage for conveying said coolant in a spiral path therethrough, said central passage having at one end thereof a converging inlet adjacent said one orifice plate, and further wherein said shield block is formed with an annular well surrounding said central passage, and a partition defining in part said central passage and separating said well from said passage.

2. A nozzle assembly according to claim 1, wherein said openings in each of said plates are offset from the openings in adjacent plates.

3. A nozzle assembly according to claim 1 said partition formed with slots establishing communication between said passage and said well for passing particulates entrained in said spiraling coolant flow therethrough for entrapment in said well.

4. A nozzle assembly according to claim 1 including an insert removably mounted in said shield block against the distal end of said partition, said insert having a bore communicating with said central passage.

5. A nozzle assembly according to claim 1 wherein said means for imparting a spiral flow to said coolant comprises a plurality of circumferentially spaced curved vanes.

6. A nozzle assembly according to claim 1, wherein said shell comprises a major portion and a lower portion detachably connected to said major portion and sealing means interposed between said major portion and said lower portion 7. A nozzle assembly according to claim 6, including means for threading said lower portion on said major portion, and means for locking said lower portion to said major portion in the assembled relation thereof.

8. A nozzle assembly according to claim 1, wherein said neutron shielding means comprises a shield block and a shield plug disposed in an abutting stacked relation and having passages therethrough for conveying said coolant from said orifice plate assembly to said diffusing means.

9. A nozzle assembly according to claim 8, wherein said diffusing means comprises an individual block having a central bore and a plurality of bores in radial spaced relation to said central bore for conveying coolant from said neutron shielding means into said duct tube for uniform distribution therethrough.

10. A nozzle assembly according to claim 9 wherein said last mentioned block is threaded within said shell in abutting engagement against said shield plug to secure said shield plug, said shield block and said orifice assembly in place in a stacked relation.

* * * * *